US011900056B2

(12) United States Patent
Srinivasan et al.

(10) Patent No.: US 11,900,056 B2
(45) Date of Patent: *Feb. 13, 2024

(54) STYLISTIC TEXT REWRITING FOR A TARGET AUTHOR

(71) Applicant: Adobe Inc., San Jose, CA (US)

(72) Inventors: Balaji Vasan Srinivasan, Bangalore (IN); Gaurav Verma, Bangalore (IN); Bakhtiyar Hussain Syed, Mumbai (IN); Anandhavelu Natarajan, Bangalore (IN)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/112,136

(22) Filed: Feb. 21, 2023

(65) Prior Publication Data

US 2023/0196014 A1 Jun. 22, 2023

Related U.S. Application Data

(60) Division of application No. 17/467,672, filed on Sep. 7, 2021, now Pat. No. 11,636,264, which is a
(Continued)

(51) Int. Cl.
*G06F 40/253* (2020.01)
*G06F 40/44* (2020.01)
(Continued)

(52) U.S. Cl.
CPC .......... *G06F 40/253* (2020.01); *G06F 40/166* (2020.01); *G06F 40/44* (2020.01);
(Continued)

(58) Field of Classification Search
CPC ...... G06F 40/253; G06F 40/166; G06F 40/44; G06F 18/214; G06F 18/217;
(Continued)

(56) References Cited

U.S. PATENT DOCUMENTS 11,157,693 B2 10/2021 Srinivasan et al.
11,636,264 B2 4/2023 Srinivasan et al.
(Continued)

OTHER PUBLICATIONS

"Notice of Allowance", U.S. Appl. No. 16/800,018, dated Jun. 23, 2021, 14 pages.
(Continued)

*Primary Examiner* — Quoc A Tran
(74) *Attorney, Agent, or Firm* — FIG. 1 Patents

(57) ABSTRACT

Rewriting text in the writing style of a target author is described. A stylistic rewriting system receives input text and an indication of the target author. The system trains a language model to understand the target author's writing style using a corpus of text associated with the target author. The language model may be transformer-based, and is first trained on a different corpus of text associated with a range of different authors to understand linguistic nuances of a particular language. Copies of the language model are then cascaded into an encoder-decoder framework, which is further trained using a masked language modeling objective and a noisy version of the target author corpus. After training, the encoder-decoder framework of the trained language model automatically rewrites input text in the writing style of the target author and outputs the rewritten text as stylized text.

20 Claims, 8 Drawing Sheets

Related U.S. Application Data continuation of application No. 16/800,018, filed on Feb. 25, 2020, now Pat. No. 11,157,693.

(51) Int. Cl.

| | |
|---|---|
| *G06F 40/166* | (2020.01) |
| *G06N 5/022* | (2023.01) |
| *G06F 40/169* | (2020.01) |
| *G06F 40/289* | (2020.01) |
| *G06V 30/418* | (2022.01) |
| *G06N 3/045* | (2023.01) |
| *G06F 18/21* | (2023.01) |
| *G06N 3/088* | (2023.01) |
| *G06F 18/214* | (2023.01) |
| *G06F 40/56* | (2020.01) |

(52) U.S. Cl.
CPC .......... *G06F 18/214* (2023.01); *G06F 18/217* (2023.01); *G06F 40/169* (2020.01); *G06F 40/289* (2020.01); *G06F 40/56* (2020.01); *G06N 3/045* (2023.01); *G06N 3/088* (2013.01); *G06N 5/022* (2013.01); *G06V 30/418* (2022.01)

(58) Field of Classification Search
CPC ...... G06F 40/169; G06F 40/289; G06F 40/56; G06N 3/045; G06N 3/088; G06N 5/022; G06V 30/418
See application file for complete search history.

(56) References Cited

U.S. PATENT DOCUMENTS

| | | | | |
|---|---|---|---|---|
| 2019/0243875 | A1* | 8/2019 | Jain | G06V 30/418 |
| 2019/0311039 | A1* | 10/2019 | Plant | G06F 40/56 |
| 2020/0250375 | A1* | 8/2020 | Maneriker | G06F 40/253 |
| 2021/0117618 | A1* | 4/2021 | Mishra | G06N 3/088 |
| 2021/0406465 | A1 | 12/2021 | Srinivasan et al. | |

OTHER PUBLICATIONS

"Pre-Interview First Office Action", U.S. Appl. No. 16/800,018, dated Apr. 29, 2021, 3 pages.
U.S. Appl. No. 17/467,672 , "Notice of Allowance", U.S. Appl. No. 17/467,672, dated Feb. 1, 2023, 19 pages.
U.S. Appl. No. 17/467,672 , "Restriction Requirement", U.S. Appl. No. 17/467,672, dated Nov. 16, 2022, 5 pages.
Brooke, Julian , et al., "A Multi-Dimensional Bayesian Approach to Lexical Style", Jun. 2013, pp. 673-679.
Brooke, Julian , et al., "Automatic Acquisition of Lexical Formality", Aug. 2010, pp. 90-98.
Devlin, Jacob , et al., "BERT: Pre-Training of Deep Bidirectional Transformers for Language Understanding", Cornell University, arXiv Preprint, arXiv.org [retrieved on Dec. 12, 2022]. Retrieved from the Internet <https://arxiv.org/pdf/1810.04805.pdf>., May 24, 2019, 16 pages.
Feng, Song , et al., "Characterizing Stylistic Elements in Syntactic Structure", Jul. 2012, 12 pages.
Fu, Zhenxin , et al., "Style Transfer in Text: Exploration and Evaluation", Thirty-Second AAAI Conference on Artificial Intelligence, vol. 32 No. 1 [retrieved Aug. 13, 2021]. Retrieved from the Internet <http://www.ruiyan.me/pubs/AAAI2018Fu.pdf>., Nov. 27, 2017, 9 pages.
Ganesan, Kavita , "Opinosis: A Graph-Based Approach to Abstractive Summarization of Highly Redundant Opinions", Aug. 2010, pp. 340-348.
Howard, Jeremy , et al., "Universal Language Model Fine-tuning for Text Classification", May 23, 2018, 12 pages.
Jain, Parag , et al., "Unsupervised Controllable Text Formalization", Feb. 20, 2019, 9 pages.
Jhamtani, Harsh , et al., "Shakespearizing Modern Language Using Copy-Enriched Sequence-to-Sequence Models", Jul. 20, 2017, 10 pages.
Lahiri, Shibamouli , "Complexity of Word Collocation Networks: A Preliminary Structural Analysis", Mar. 6, 2014, 10 pages.
Lample, Guillaume , et al., "Cross-lingual Language Model Pretraining", Jan. 22, 2019, 10 pages.
Lample, Guillaume , et al., "Unsupervised Machine Translation Using Monolingual Corpora Only", Apr. 13, 2018, 14 paGes.
Li, Juncen , et al., "Delete, Retrieve, Generate: A Simple Approach to Sentiment and Style Transfer", Proceedings of the 2018 Conference of the North American Chapter of the Association for Computational Linguistics: Human Language Technologies, vol. 1 [retrieved Aug. 13, 2021] Retrieved from the Internet <https://aclanthology.org/N18-1169.pdf>., Apr. 17, 2018, 12 pages.
Liang, Johan , et al., "Brand Personality of Two Beverages Categories", Jul. 2011, 10 pages.
Lin, Chin-Yew , "ROUGE: A Package for Automatic Evaluation of Summaries", Information Sciences Institute University of Southern California [retrieved Mar. 23, 2023]. Retrieved from the Internet <https://aclanthology.org/W04-1013.pdf>., Jul. 25, 2004, 8 pages.
Merity, Stephen , et al., "Pointer Sentinel Mixture Models", Sep. 26, 2016, 13 pages.
Papineni, Kishore , et al., "BLEU: a Method for Automatic Evaluation of Machine Translation", Proceedings of the 40th Annual Meeting of the Association for Computational Linguistics (ACL) [retrieved Aug. 16, 2021]. Retrieved from the Internet <https://aclanthology.org/P02-1040.pdf>., Jul. 2002, 8 Pages.
Radford, Alec , et al., "Improving Language Understanding by Generative Pre-Training", Computer Science [retrieved Dec. 11, 2022]. Retrieved from the Internet <https://www.cs.ubc.ca/~amuham01/LING530/papers/radford2018improving.pdf>., Aug. 2018, 12 pages.
Radford, Alec , et al., "Language Models are Unsupervised Multitask Learners", OpenAI blog, vol. 1, No. 8 [retrieved Dec. 11, 2022]. Retrieved from the Internet <https://life-extension.github.io/2020/05/27/GPT%E6%8A%80%E6%9C%AF%E5%88%9D%E6%8E%A2/language-models.pdf>., Mar. 2019, 24 pages.
Rao, Sudha , et al., "Dear Sir or Madam, May I Introduce the GYAFC Dataset: Corpus, Benchmarks and Metrics for Formality Style Transfer", Proceedings of the 2018 Conference of the North American Chapter of the Association for Computational Linguistics: Human Language Technologies, vol. 1 [retrieved Aug. 16, 2021]. Retrieved from the Internet <https://aclanthology.org/N18-1012.pdf>., Apr. 16, 2018, 12 pages.
Shen, Tianxiao , et al., "Style Transfer from Non-Parallel Text by Cross-Alignment", NIPS'17: Proceedings of the 31st International Conference on Neural Information Processing Systems [retrieved Aug. 13, 2021]. Retrieved from the Internet <https://proceedings.neurips.cc/paper/2017/file/2d2c8394e31101a261abf1784302bf75-Paper.pdf>., Nov. 6, 2017, 12 pages.
Tikhonov, Alexey , et al., "Guess who? Multilingual approach for the automated generation of author-stylized poetry", Sep. 17, 2018, 8 pages.
Vaswani, Ashish , et al., "Attention Is All You Need", Cornell University arXiv Preprint, arXiv.org [retrieved Mar. 28, 2023]. Retrieved from the Internet <https://arxiv.org/pdf/1706.03762.pdf>., Dec. 6, 2017, 15 pages.

* cited by examiner

STYLISTIC TEXT REWRITING FOR A TARGET AUTHOR

RELATED APPLICATIONS

This application is a divisional of and claims priority to U.S. patent application Ser. No. 17/467,672, which is a continuation of and claims priority to U.S. patent application Ser. No. 16/800,018, filed Feb. 25, 2020, entitled "Stylistic Text Rewriting for a Target Author," the disclosures of which are hereby incorporated by reference in their entireties.

BACKGROUND

Ghostwriters are commonly used to compose written communications, speeches, literary works, and other texts on behalf of another to be credited as the text's author. A primary obstacle for ghostwriters is maintaining a linguistic identity of the individual to be credited as the text's author, such as choice of words, formality, excitement, punctuation usage, sentence structure, and so forth. Similarly, communications department copywriters are tasked with drafting internal and external communications on behalf of an entity (e.g., a corporation, a group of individuals, etc.) while maintaining a certain writing style for the entity. For entities that require substantial amounts of text to be authored in a consistent writing style, it becomes increasingly difficult to maintain the writing style as a number of different copywriters increases, and a success rate is entirely dependent on an individual copywriter's ability to understand and mimic subtleties of a target author's writing style.

To reduce this human error associated with writing in the style of another, some conventional approaches leverage tools that provide stylistic feedback to copywriters during the writing process. For instance, these conventional tools may suggest alternate words, identify misspellings, identify grammatical incongruities, suggest punctuation alternatives, and so forth. However, such conventional approaches remain reliant on a copywriter's ability to understand which suggestion is appropriate to use for a target author. Consequently, these approaches are unable to scale to generate stylized text for authors or entities having writing styles that are unfamiliar to copywriters. As a result, conventional approaches remain susceptible to human error and are unable to automatically rewrite an input text with high fidelity to the writing style of a target author.

SUMMARY

Generating stylized text by rewriting input text in the writing style of a target author is described. A stylistic rewriting system receives input text including at least one sentence and an indication of a target author for whom the input text is to be rewritten. The stylistic rewriting system then determines a writing style of the target author. In order to determine the writing style of the target author, the stylistic rewriting system obtains a corpus of text that is authored by, or otherwise attributable to, the target author. The stylistic rewriting system further obtains a language model, which has been pre-trained with a masked language modeling objective to understand nuances of the language in which the input text and the corpus of text associated with the target author are written. The language model may be configured as a transformer-based language model, and its pre-training may be performed by the stylistic rewriting system.

Given the pre-trained language model, the stylistic rewriting system further trains the language model to understand the writing style of the target author using the corpus of text associated with the target author. To do so, the stylistic rewriting system first generates a noisy version of the target author corpus by separating the target author corpus into different word sequences (e.g., by sentence) and masking a subset of words of each sequence. In addition to masking words of a sequence, the stylistic rewriting system is further configured to generate a noisy version of the target author corpus by shuffling positions of words of each sequence, relative to one another. Two copies of the pre-trained language model are then cascaded into an encoder-decoder framework and the encoder-decoder framework is trained with a denoising auto encoder objective and the noisy version of the target author corpus.

Using the masked language modeling objective of the language model, the encoder portion of the framework attempts to predict the underlying value of masked words in the noisy version of the target author corpus, while the decoder portion uses the encoder's predictions to reconstruct a non-noisy version of the target author corpus. The encoder-decoder framework is fine-tuned using denoising auto-encoder loss to output a trained language model, which is fine-tuned until the model's output matches the non-noisy target author corpus. By virtue of training on the noisy target author corpus, the trained language model is configured to process the input text and generate stylized text, which represents the input text rewritten in the writing style of the target author.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
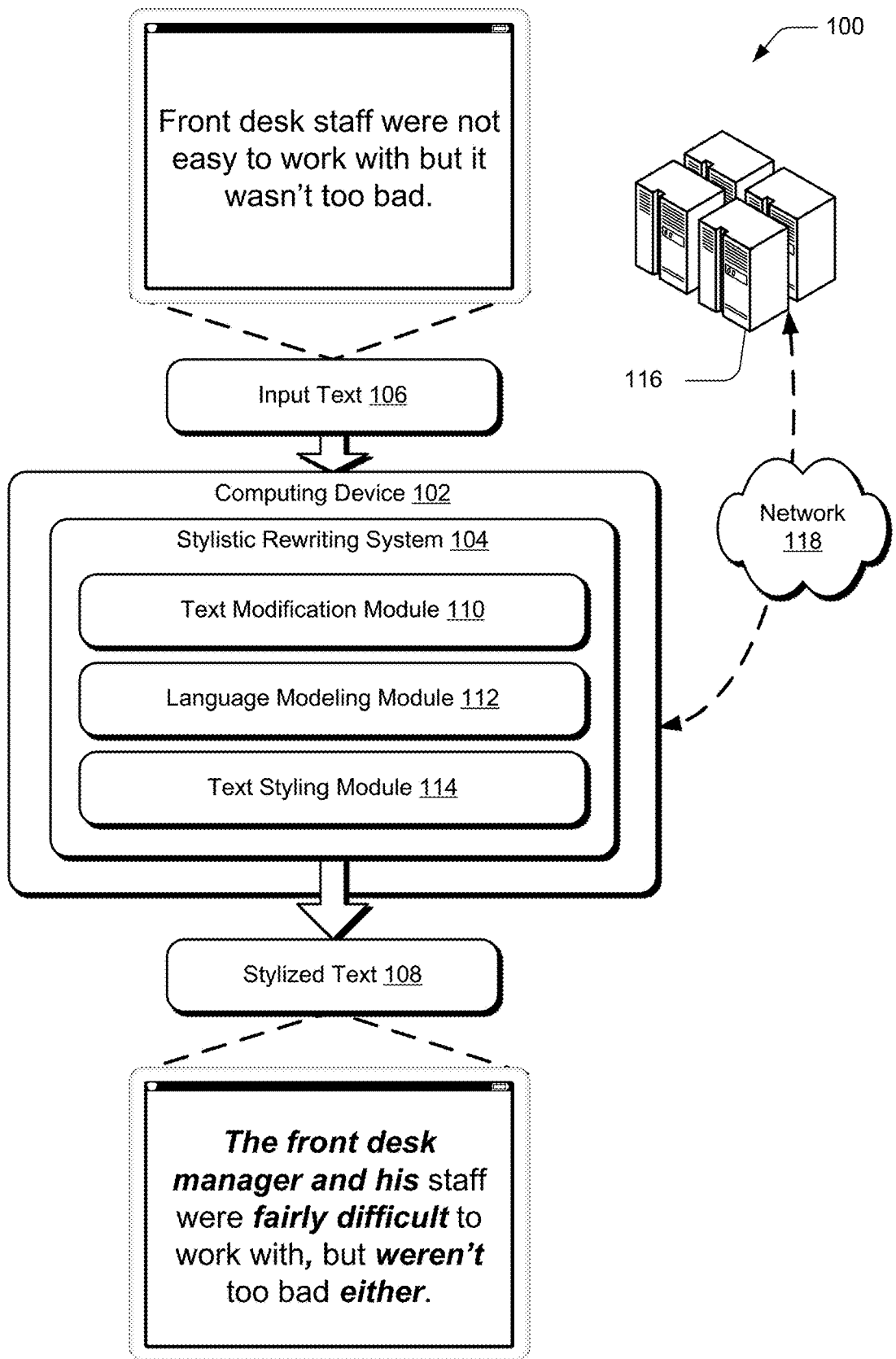
FIG. 1 is an illustration of an environment in an example implementation that is operable to employ the stylistic text rewriting techniques described herein.

With advances in computing device technology, conventional tools provide authors with stylistic feedback composing text. For instance, word processing platforms provide visual indications that notify an author when a word has been misspelled or when a sentence's structure can be improved to address grammatical concerns such as verb use, passive voice, and so forth. However, existing tools are configured using only general linguistic guidelines for a language, and are unable to adapt to consider specific aspects of a particular author's writing style. For instance, conventional systems are unable to consider whether aspects of writing style such as formality, excitement, sentence structure, and so forth are suitable for a particular author composing text. Conventional systems are similarly unable to account for linguistic nuances associated with various levels of these writing style aspects. For instance, a formality aspect of an author's writing style may be further defined at a punctuation level and a word choice level. Certain punctuation and word choice uses may collectively define a first author's writing style and differ sharply from a second author's writing style, despite the fact that the first and second authors compose text in a common language. Consequently, conventional systems are unable to understand an author's particular writing style, much less provide feedback regarding modifications to better align text with the author's particular writing style.

Some conventional approaches have attempted to define an author's writing style using parallel datasets, where similar texts composed by different authors are manually labeled to enumerate authors' linguistic differences. These labeled datasets are then used to train a language model under supervised learning, with the goal of the language model identifying aspects of a particular author's writing style. However, these conventional approaches are limited in scope to authors for whom parallel, labeled datasets are available, and are unable to scale to accommodate new authors for whom parallel comparative texts are unavailable. As an alternative to these supervised learning approaches, some conventional language modeling approaches define linguistic rules for a designated author and attempt to generate text under constraints specified by the linguistic rules. However, these linguistic rule-based approaches are intractable given the large number of rules required to capture a target author's writing style, and are limited in their performance by the level of detail included in the linguistic rules, which are often manually generated (e.g., via user inputs to define the rules). Thus, conventional approaches to language modeling are unable to rewrite text in the writing style of a target author, absent a parallel corpus of text with labels enumerating different aspects of writing styles for both the target author and the author of the parallel corpus of text.

Accordingly, stylistic rewriting methods and systems are described herein. A stylistic rewriting system receives input text and an indication of a target author whose writing style is to be used in rewriting the input text. In order to automatically determine the writing style of the target author (e.g., independent of user input defining one or more writing style constraints), the stylistic rewriting system obtains a corpus of text written by, or attributable to, the target author. The stylistic rewriting system further obtains a language model that has been pre-trained with a masked language modeling objective such that the language model understands nuances of the language in which the input text and the target author corpus are written. Alternatively, in implementations where a pre-trained language model is unavailable, the stylistic rewriting system is configured to train the language model to understand a language's nuances prior to learning the target author's writing style. In some implementations, the language model is configured using a transformer-based architecture.

To further train the language model in understanding the target author's writing style, the stylistic rewriting system generates a noisy version of the target author corpus, by first separating the corpus into individual sentences and further obfuscating certain words of each sentence by masking a subset of the sentence's words. Alternatively or additionally, the stylistic rewriting system generates a noisy version of the target author corpus by shuffling positions of words in the sentence relative to one another. The stylistic rewriting system then cascades two copies of the pre-trained language model into an encoder-decoder framework. The encoder-decoder framework is then provided with the noisy version of the target author corpus together with a masked language modeling objective.

Under the masked language modeling objective, the encoder portion is trained to predict the underlying value of masked words in the noisy version of the target author corpus, while the decoder portion uses the encoder's predictions to reconstruct a non-noisy version of the target author corpus by outputting the words of a given sentence in their correct positional ordering. To fine-tune the encoder-decoder framework in learning the target author's writing style, the encoder-decoder framework is trained using denoising auto-encoder loss until the framework's output matches the target author corpus (e.g., without any masked or shuffled words).

By virtue of being trained with a noisy corpus of text and a masked language modeling objective, the encoder-decoder framework of the trained language model is configured to adapt to generic text and rewrite the generic text in the writing style of the target author. Input text is then provided to the trained language model, which rewrites the input text in the writing style of the target author whose writing corpus was used to train the model. In contrast to conventional language modeling approaches, the techniques described herein do not require that either the input text or the target author corpus of text be labeled to enumerate any linguistic aspects or aspects of the corresponding author's writing style. Similarly, the techniques described herein do not require that a parallel corpus of text to the target author's corpus of text be provided in order to contrast the target author's writing style with other authors. In this manner, the techniques described herein are advantageously able to scale to accommodate any author for whom a corpus of text is available, without requiring annotated data in order to capture the target author's linguistic style. With the decreased amount of information required to both learn a target author's writing style and rewrite input text in the target author's writing style, the techniques described herein require fewer network and computational resources in comparison to conventional language modeling approaches.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 8.

The computing device 102 is illustrated as including a stylistic rewriting system 104. The stylistic rewriting system 104 is representative of functionality of the computing device 102 to receive an input text 106 and rewrite the input text 106 to generate a stylized text 108 written in the writing style of a target author. For instance, in the illustrated example of FIG. 1, the input text 106 represents a sentence written by an unknown author and the stylistic rewriting system 104 rewrites the input text in the writing style of Sir Arthur Conan Doyle to generate stylized text 108, with differences visually emphasized in bold italics for illustrative purposes. Contrasted against the input text 106, the stylized text 108 includes verbosity attributable to the writing style of Sir Arthur Conan Doyle. As described herein, the writing style of a target author may also be referred to as the target author's linguistic style, which may be characterized by various writing attributes, such as formality (e.g., punctuation usage, lexical attributes, syntax structure), excitement, choice of words (e.g., usage of colloquial words to better resonate with audience), sentence nature (e.g., long complex sentences vs. short simple sentences), combinations thereof, and so forth. In this manner, the stylized text 108 represents an instance of the input text 106 written in the writing style of the target author, without requiring enumeration of different style aspects of the author of the input text 106 or requiring a parallel corpus of text to contrast writing styles of the author of the input text 106 with the target author.

To generate the stylized text 108, the stylistic rewriting system 104 employs a text modification module 110, a language modeling module 112, and a text styling module 114. The text modification module 110, the language modeling module 112, and the text styling module 114 are each implemented at least partially in hardware of the computing device 102 (e.g., through use of a processing system and computer-readable storage media), as described in further detail below with respect to FIG. 8.

The text modification module 110 is configured to generate masked versions of text for use in training a language model to be used by the stylistic rewriting system 104 in generating the stylized text 108. For instance, in an example implementation where a language model implemented by the language modeling module 112 is not pre-trained, as described in further detail below, the text modification module 110 is configured to obtain an input text language corpus, which represents a corpus of text written by any number of authors in the language of the input text 106. The corpus of text used to pre-train the language model is not associated with any single author and rather represents a "world of knowledge" for a language, sampled from different authors having different writing styles.

The text modification module 110 is further configured to obtain a target author corpus, which represents a corpus of text written by the target author whose writing style is to be used in generating the stylized text 108. The text modification module 110 is configured to retrieve the input text language corpus and the target author corpus from any suitable location, such as via input to the computing device 102 and/or from storage of the computing device 102, as described in further detail below with respect to FIG. 8. Alternatively or additionally, the text modification module 110 may obtain input text language corpus and the target author corpus from one or more locations other than the computing device 102, such as from remote storage location 116, from a different computing device, via network 118, combinations thereof, and so forth.

In implementations where the language model used by the stylistic rewriting system 104 is not pre-trained on a corpus of text written in the language of the input text 106, the stylistic rewriting system 104 is configured to train the language model to understand the nuances of the language in which the input text 106 is written. To do so, the text modification module 110 generates a masked version of the input text language corpus by separating the input text language corpus into individual sentences and masking a subset of words in each sentence. The masked input text language corpus is subsequently useable by the language modeling module 112 to train a language model to understand nuances of the language in which the input text 106 is written, as described in further detail below. In a similar manner, the text modification module 110 is configured to generate a masked version of the target author corpus, which is useable by the language modeling module 112 to fine-tune the trained language model to understand the writing style of the target author for use in generating the stylized text 108.

Given a language model and the masked input text language corpus, the language modeling module 112 is configured to train the language model to capture the nuances of the language in which the input text 106 is written, by modeling the probability of the next word in a text sequence based on the preceding word(s) in the sentence. In accordance with one or more implementations, the language model implemented by the language modeling module 112 is configured using a transformer-based architecture, as described in further detail below. Although the language modeling module 112 is configured to train a transformer-based language model using the techniques described herein, the language modeling module 112 may alternatively implement a pre-trained language model in generating the stylized text 108.

Given a language model pre-trained on a corpus of text written in the same language as the input text 106, the language modeling module 112 is configured to further train the language model to understand the nuances of the target author's writing style in which the stylized text 108 is to be written. To do so, the language modeling module 112 trains the language model using the masked target author corpus generated by the text modification module 110 as input to an encoder-decoder framework, where both the encoder and decoder are configured based on the pre-trained language model. As an input to the encoder-decoder framework, the language modeling module 112 provides the masked target author corpus, with the objective of the framework being the output of a clean version of the target author corpus (e.g., with masked words replaced by their actual un-masked values). The language modeling module 112 is configured to fine-tune the encoder-decoder framework of the transformer-based language model using a denoising auto-encoder loss, which teaches the language model to reconstruct noisy (e.g., masked) input text with correct (e.g., unmasked) text. After training the transformer-based language model using the target author corpus, the language modeling module 112 outputs a trained language model. The trained language model is then provided to the text styling module 114, which is configured to generate the stylized text 108 by applying the input text to the trained language model.

The stylized text 108, the input text 106, and other information processed or generated by the stylistic rewriting system 104 may be stored in storage of the computing device 102, as described in further detail below with respect to FIG. 8. Alternatively or additionally, the stylistic rewriting system 104 is configured to provide the input text 106, the stylized text 108, and additional information described in further detail below with respect to FIGS. 2-7 to a remote storage location for subsequent retrieval and/or access by the computing device 102 or different computing devices. For instance, the stylistic rewriting system 104 may communicate information to remote storage location 116, or directly to a different computing device, via network 118.

Having considered an example digital medium environment, consider now a discussion of an example system useable to generate stylized text in the writing style of a target author in accordance with aspects of the disclosure herein.

Figure 2:
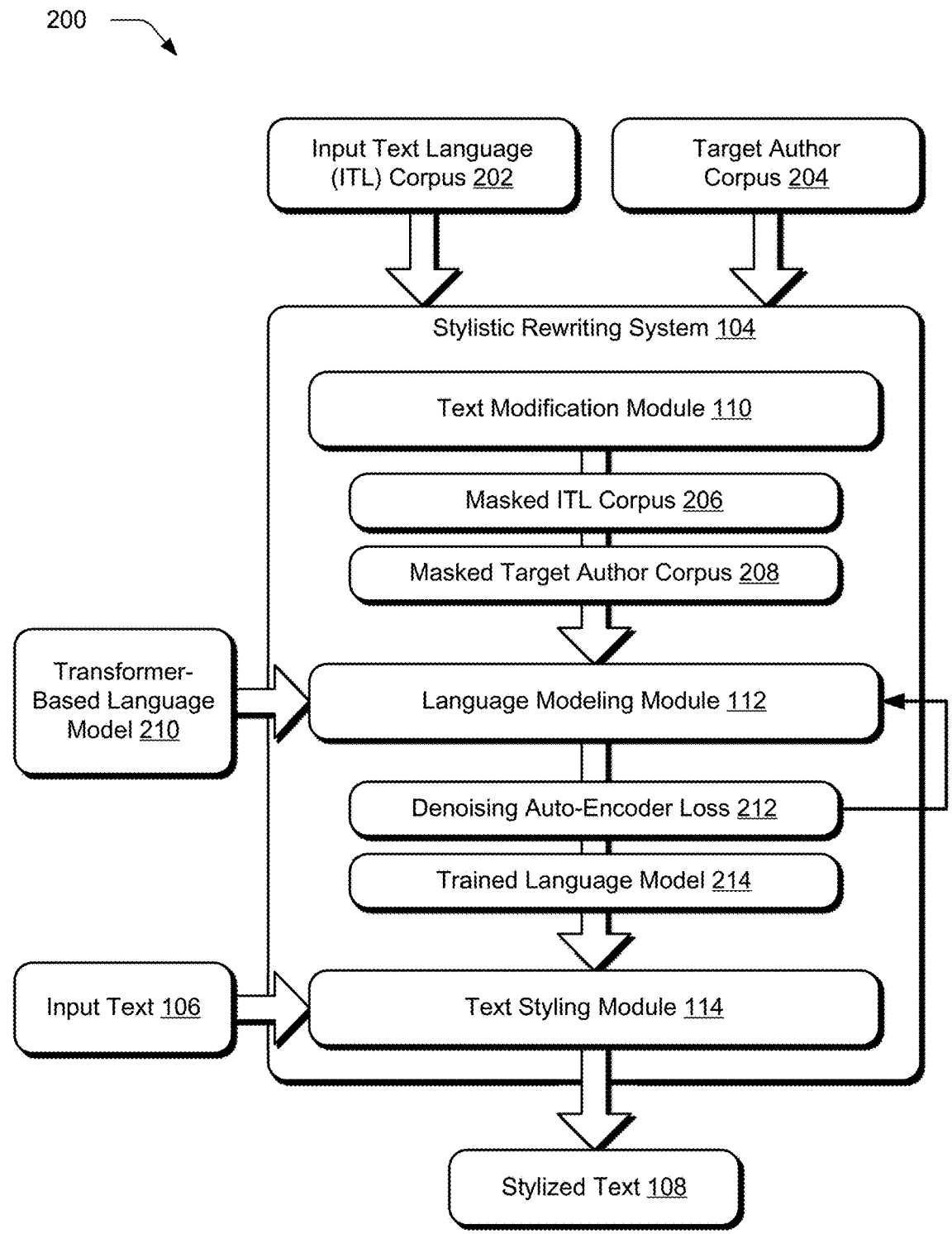
FIG. 2 illustrates an example implementation in which the stylistic rewriting system of FIG. 1 generates, from input text, stylized text in the writing style of a target author using techniques described herein.

FIG. 2 illustrates an example system 200 useable to generate stylized text 108, which is representative of the input text 106 rewritten in the writing style of a target author. In the illustrated example, system 200 includes modules of the stylistic rewriting system 104 as introduced with respect to FIG. 1, such as the text modification module 110, the language modeling module 112, and the text styling module 114. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 8.

In the example system 200, the stylistic rewriting system 104 receives the input text 106 to be rewritten in the writing style of a target author. In accordance with one or more implementations, although not depicted, the input text 106 is received together with an indication of the target author whose writing style is to be used in generating the stylized text 108. The input text 106 is representative of a transcript written in a language that includes at least one sentence. Although the input text 106 may be written in any language, it is described herein in the context of being written in the English language. In addition to receiving the input text 106, the stylistic rewriting system 104 is configured to receive an input text language (ITL) corpus 202 and a target author corpus 204. The ITL corpus 202 is representative of a collection of writings associated with any number of authors and thus exemplifies a "world of knowledge" describing a language in which the input text 106 is written. In this manner, continuing the example of the input text 106 being written in the English language, the ITL corpus 202 comprises a collection of writings by a variety of authors in the English language. The target author corpus 204 is representative of a collection of writings attributable to the target author whose writing style is to be used in generating the stylized text 108, and is useable by the stylistic rewriting system 104 to glean the target author's linguistic style. Similar to the ITL corpus 202, the target author corpus 204 includes a collection of text written in the same language as the input text 106.

Upon receiving the input text 106 and the ITL corpus 202, the text modification module 110 is configured to generate a masked ITL corpus 206 for use in training a language model to understand the nuances of the language in which the input text 106 is written. Although the stylistic rewriting system 104 is configured to initially train a language model used by the language modeling module 112 to understand the nuances of a language, in some implementations the stylistic rewriting system 104 is configured to leverage a language model that has been previously trained on a corpus of text written in the same language as the input text 106. In such implementations where a pre-trained language model is leveraged by the language modeling module 112, the text modification module 110 may refrain from generating the masked ITL corpus 206.

The masked ITL corpus 206 represents the ITL corpus 202 segmented into different sequences, where each sequence of the masked ITL corpus 206 corresponds to a different sentence in the ITL corpus 202. In addition to segmenting the ITL corpus 202 into different sentences, the masked ITL corpus 206 includes a subset of words of each sequence (e.g., approximately 15% of words of each sequence) replaced with a "[mask]" token, which obfuscates the underlying word of the sequence. The masked ITL corpus 206 is then useable by the language modeling module 112 to train a language model to understand language nuances of the input text 106 language, as described in further detail below. In addition to generating the masked ITL corpus 206, the text modification module 110 is configured to generate a masked target author corpus 208. The masked target author corpus 208 represents the target author corpus 204 segmented into different sequences, where each sequence of the masked target author corpus 208 corresponds to a different sentence in the target author corpus 204. In addition to segmenting the target author corpus 204 into different sentences, the masked target author corpus 208 includes a subset of words of each sequence replaced with a "[mask]" token, which obfuscates the underlying word of the sequence. The masked target author corpus 208 is then useable by the language modeling module 112 to further train a pre-trained language model to understand the specific linguistic writing style of the target author for use in generating the stylized text 108.

The masked ITL corpus 206 and the masked target author corpus 208 are then communicated to the language modeling module 112 for use in training a transformer-based language model 210. An example architecture of the transformer-based language model 210 is described in further detail below with respect to FIGS. 3-5. The transformer-based language model 210 may be received from any suitable location, such as from local storage of computing device 102, from remote storage location 116, from a different computing device via network 118, or combinations thereof. In order to initially train the transformer-based language model 210 to understand nuances of the language in which the input text 106 is written, the language modeling module 112 is configured to train the transformer-based language model 210 using a masked language modeling objective. By leveraging a masked language modeling objective, the language modeling module 112 causes the transformer-based language model 210 to predict the original value of makes words in the masked ITL corpus 206, based on other non-masked words in the corresponding sequence of the masked ITL corpus 206.

The language modeling module 112 is configured to train the transformer-based language model 210 using the masked ITL corpus 206 until the model's perplexity exhibits no improvement over the ITL corpus 202. As described herein, the transformer-based language model 210's perplexity refers to an information-theoretic manner of measuring the efficacy of the transformer-based language model's ability to predict masked words in the masked ITL corpus 206. By training the transformer-based language model 210 on the masked ITL corpus 206, the language modeling module 112 enables the transformer-based language model 210 to learn the nuances of a language across the different writing styles of a diverse range of authors, thereby learning a generic representation of the language in which the input text 106 is written.

After initially training the transformer-based language model 210 to learn a generic representation of the language in which the input text 106 is written, or in implementations where the transformer-based language model 210 is received as previously trained on a corpus of text authored in the same language as the input text 106, the language modeling module 112 is configured to further train the transformer-based language model 210 to learn the linguistic style of the target author for use in generating the stylized text 108. In order to fine-tune the transformer-based language model 210 to model the linguistic style of a target author, the language modeling module 112 generates an encoder-decoder framework, where both the encoder and decoder are generated based on the pre-trained transformer-based language model 210. As an input to the encoder-decoder framework, the language modeling module 112 provides the masked target author corpus 208, which represents a noisy version of the target author corpus 204. In addition to masking a subset of words in each sequence of the target author corpus 204, the masked target author corpus 208 may further be made noisy by shuffling words of individual sequences (e.g., sentences) in the target author corpus 204. By enforcing a masked language objective, the language modeling module 112 causes the output of the encoder-decoder framework to be the target author corpus 204, with masked words in the masked target author corpus 208 replaced with their original values by virtue of the predictive nature of the encoder-decoder framework.

In order to train the encoder-decoder framework to accurately predict values of masked words in the masked target author corpus 208, the language modeling module 112 leverages denoising auto-encoder loss 212. Stated mathematically, the denoising auto-encoder loss 212 can be represented as $L^{lm}$, as set forth in Equation 1:

$$L^{lm} = E_{x \sim S}[-\log P_s(x|C(x))] \tag{Eq.1}$$

As represented in Equation 1, the denoising auto-encoder loss 212, Lm, represents the negative log-likelihood of reconstructing original text x (e.g., the target author corpus 204) from a noisy version of the original text C(x) (e.g., the masked target author corpus 208). In Equation 1, s represents the target author's linguistic style to be used in generating the stylized text 108 and S represents the set of sentences in the original text (e.g., the target author corpus 204).

Using the denoising auto-encoder loss 212, the language modeling module 112 is configured to generate a trained language model 214 by cascading two copies of the pre-trained transformer based language model 210 into the encoder-decoder framework. In the encoder-decoder framework, the encoder aims to generate the original, unmasked values of words represented by mask tokens in the masked target author corpus 208, while the decoder portion of the framework aims to reconstruct the encoder's output of unmasked text in the writing style of the target author to be used in generating stylized text 108. The language modeling module 112 uses the target author corpus 204 as a ground truth together with the denoising auto-encoder loss 212 to fine-tune the encoder-decoder framework of the trained language model 214 to learn the specific linguistic style attributable to the target author of the target author corpus 204. At the completion of training, the trained language model 214 includes the encoder-decoder framework, where the encoder captures information conveyed in any input text into a hidden vector that is useable by the decoder to rewrite the input text in the linguistic style of the target author of the target author corpus 204 on which the trained language model 214 was trained.

The trained language model 214 is then communicated to the text styling module 114, which is configured to generate the stylized text 108 by applying the input text 106 to the trained language model 214. Using the techniques described herein, the stylistic rewriting system 104 is configured to generate a trained language model 214 for any number of different target authors. In this manner, the text styling module 114 is configured to store a plurality of different trained language models 214, one for each different target author, such that the input text 106 can be rewritten to generate stylized text 108 based on an indication of a target author's identity.

Having considered an example system for generating stylized text that represents input text rewritten in the writing style of a target author, consider now aspects of the example system in accordance with aspects of the disclosure herein.

Figure 3:
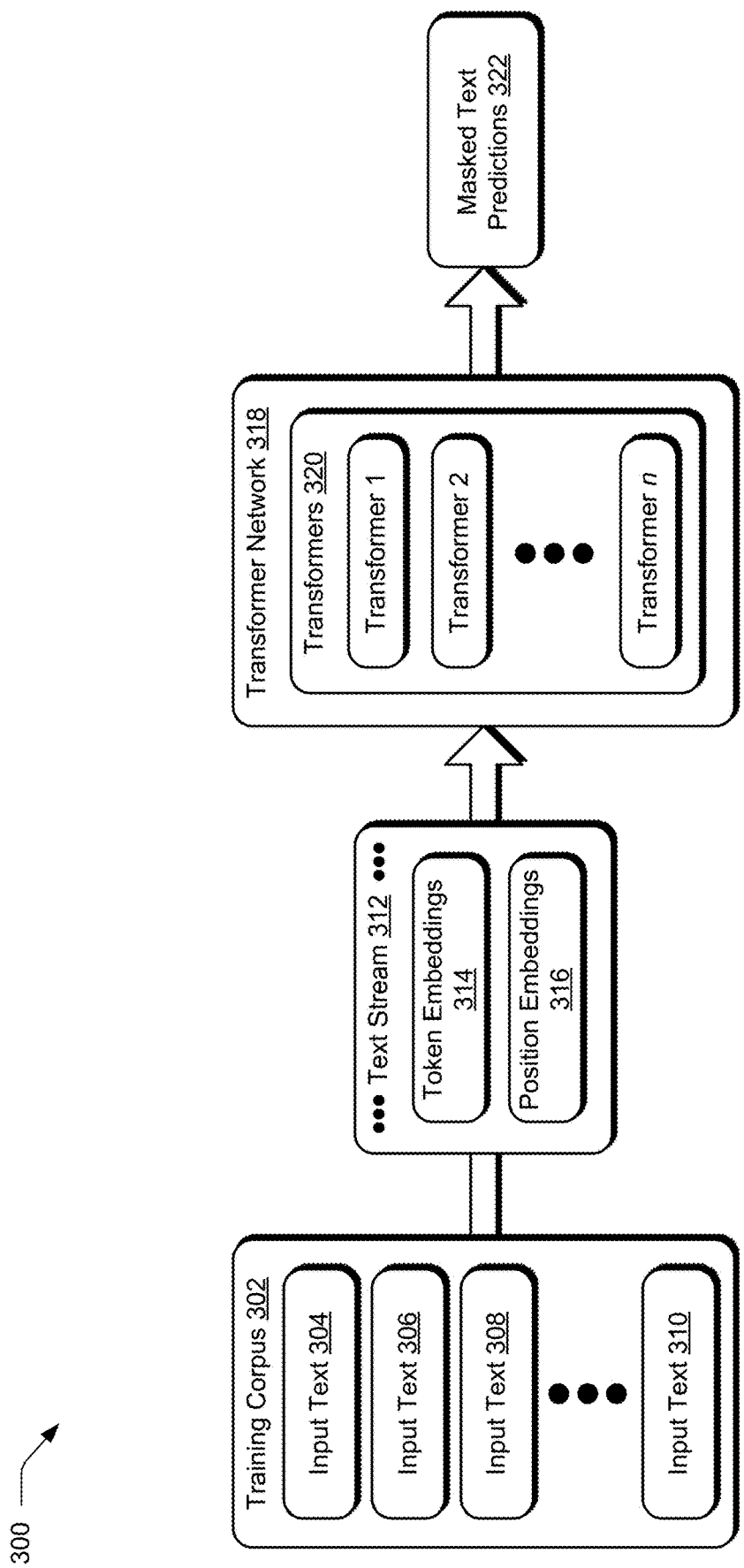
FIG. 3 illustrates an example implementation of the stylistic rewriting system of FIG. 1 training a transformer-based language model to identify the nuances of a language and writing style of a target author.

FIG. 3 illustrates an example implementation of the stylistic rewriting system 104 training a transformer-based language model to identify the nuances of a language and writing style of a target author. In the illustrated example, a training corpus 302 includes a set of different input texts 304, 306, 308, and 310. Although the training corpus 302 is illustrated as including four different input texts, the training corpus 302 may comprise any suitable number of input texts, as indicated by the ellipses separating input text 308 and input text 310.

In the context of pre-training the transformer-based language model 210 to learn the nuances of the language of the input text 106, as described above with respect to FIG. 2, the training corpus 302 is representative of the masked ITL corpus 206, generated from the ITL corpus 202. The different input texts 304, 306, 308, and 310 may thus be representative of texts written by different authors having distinct linguistic styles, such that the training corpus 302 represents a world of knowledge describing a particular language.

Conversely, in the context of further training a pre-trained transformer-based language model 210 to learn the specific writing style of a target author, the training corpus 302 is representative of the masked target author corpus 208, generated from the target author corpus 204. In the context of learning a target author's writing style, the different input texts 304, 306, 308, and 310 are thus representative of texts written by the same target author, such that the training corpus 302 represents an overall linguistic style of the target author. Each of the input texts 304, 306, 308, and 310 include at least on sentence, and may include any number of sentences of text written in the same language as the input text 106.

The input texts 304, 306, 308, and 310 of the training corpus 302 are then separated into a plurality of text streams 312, where each text stream 312 represents an individual sentence from the input texts 304, 306, 308, and 310. As such, a number of text streams 312 corresponds to a number of sentences included in the training corpus 302, which may alternatively be referred to as sequences. In accordance with one or more implementations, the text streams 312 are generated by the text modification module 110 of the stylistic rewriting system 104.

Each text stream 312 comprises one or more token embeddings 314 and one or more corresponding position embeddings 316, where a number of the token embeddings 314 and position embeddings 316 are dependent on a number of words in the sentence/sequence represented by the text stream 312. For example, in a scenario where a sentence from the training corpus 302 contains the six words "Take the train into the town," the corresponding text stream 312 would include seven token embeddings 314 and seven position embeddings 316. Each of the seven token embeddings 314 indicate either a new sentence/sequence marker, a mask token, or a value of an actual word included in the sentence of the text stream 312. Each of the seven position embeddings 314 indicate a position of the corresponding word represented by the token embeddings 314, as organized in the sentence represented by the text stream 312. For instance, continuing the example of the text stream 312 representing the sentence "Take the train into the town," Table 1 represents example values for each of the token embeddings 314 and position embeddings 316.

TABLE 1

| Sentence Word | Token Embedding | Position Embedding |
| --- | --- | --- |
|  | [/s] | 0 |
| Take | [mask] | 1 |
| the | the | 2 |
| train | train | 3 |
| into | into | 4 |
| the | [mask] | 5 |
| town | town | 6 |

As indicated in Table 1, the sentence represented by the text stream 312 includes six different sentence words, with token embeddings 314 and position embeddings 316 corresponding to each of the different sentence words. In addition, the token embeddings 314 and position embeddings 316 each include one additional entry, represented in Table 1 as token embedding "[/s]" and corresponding position embedding "0," indicating the beginning of a new sentence.

As further indicated in Table 1, a subset of the sentence words are represented as "[mask]" tokens in the token embeddings 314, which are usable by the stylistic rewriting system 104 to train the transformer-based language model 210 using a masked language modeling objective. As described herein, the masked language modeling objective may be any known masked language modeling objective, and causes the transformer network 318 to generate masked text predictions 322 for token embeddings 314 represented by "[mask]" tokens, where the masked text predictions 322 represent predictions of underlying words of the training corpus 302. For instance, in an example scenario where the training corpus 302 represents the masked ILT corpus 206 described and illustrated with respect to FIG. 2, the masked text predictions 322 are the underlying words of the ILT corpus 202 that are represented by masked token embeddings 314 in the text stream 312. Likewise, when the training corpus 302 represents the masked target author corpus 208 described and illustrated with respect to FIG. 2, the masked text predictions 322 are the underlying words of the target author corpus 204.

To generate the masked text predictions 322, the transformer network 318 includes a plurality of transformers 320, represented in FIG. 3 by transformer 1, transformer 2, and transformer n, where n may represent any suitable integer and each transformer 320 comprises a different layer in the transformer network 318. In accordance with one or more implementations, the transformer network 318 comprises 12 different transformer layers. Example instances of a transformer 320 are described and illustrated in further detail below with respect to FIG. 4.

The masked text predictions 322 represent predictions made by the transformer-based language model 210 as to the actual value of the underlying word represented by a "mask" token, such as the words "Take" and "the," as indicated above in Table 1. In order to generate a trained language model 214, the language modeling module 112 of the stylistic rewriting system 104 is configured to train the transformer-based language model 210 using denoising auto-encoder loss 212 until the language model's output probabilities perplexity shows no improvement over the validation dataset (e.g., the input text language corpus 202 or the target author corpus 204).

Figure 4:
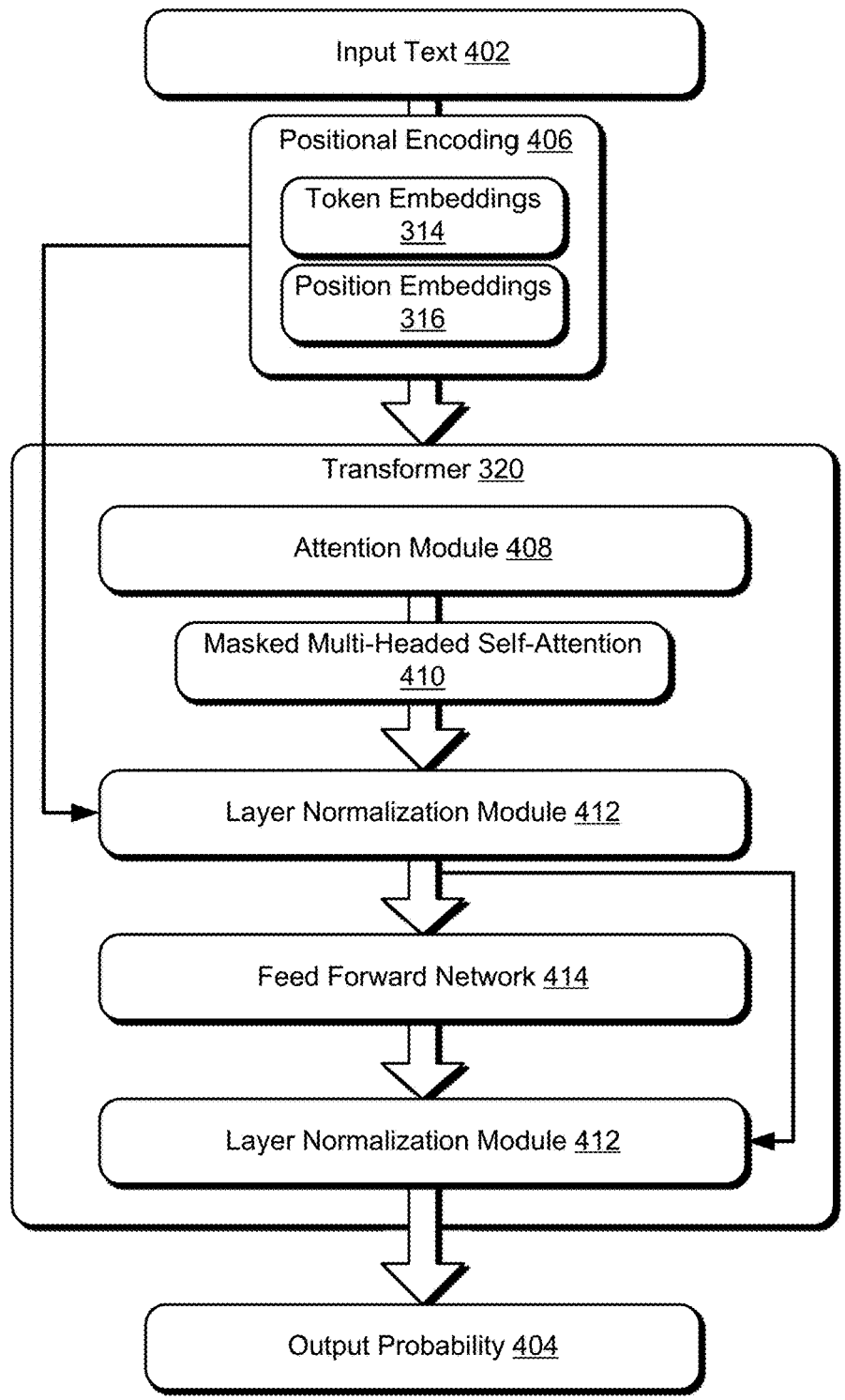
FIG. 4 illustrates an example transformer architecture for a transformer-based language model implemented by the stylistic rewriting system of FIG. 1.

FIG. 4 illustrates an example transformer architecture for a transformer-based language model implemented by the stylistic rewriting system 104. In the illustrated example, input text 402 is input to transformer 320, which may be representative of an initial transformer layer of a transformer-based language model 210, such as the transformer network 318 as illustrated in FIG. 3. In implementations where the stylistic rewriting system 104 is configured to train the transformer-based language model 210 to understand the nuances of a language as a whole, the input text 402 is representative of the masked ILT corpus 206 generated by the text modification module 110, as illustrated and described with respect to FIG. 2. Alternatively, in implementations where the stylistic rewriting system 104 is configured to further train a pre-trained transformer-based language model 210 to understand the specific linguistic style of a target author, the input text 402 is representative of the masked target author corpus 208 generated by the text modification module 110, as illustrated and described with respect to FIG. 2. In the following description of the example transformer architecture illustrated in FIG. 4, the input text 402 is described in the context of the masked target author corpus 208.

In the illustrated example, transformer 320 is representative of a transformer layer in a transformer network 318, which forms the basis for the transformer-based language model 210. The input text 402 is representative of the masked target author corpus 208, where the language modeling module 112 trains the transformer-based language model 210 with a masked language modeling objective to generate an output probability 404, where the output probability 404 represents the language model's prediction of an underlying value for a word in the input text 402 obfuscated by a mask token.

To generate the output probability 404 for a word in the input text 402 obscured by a mask token, positional encoding 406 information for the input text 402 is passed to an attention module 408 of the transformer 320. The positional encoding 406 for the input text 402 includes token embeddings 314 and position embeddings 316, which describe the underlying word and its corresponding position in the input text 402. As described above with respect to FIG. 3, a subset of words in each sentence of the input text 402 include "[mask]" token embeddings 314, hiding the corresponding underlying word(s) from being identified by the transformer 320. In some implementations, the positional encoding 406 is communicated to the attention module 408 in the form of a matrix, where an input sequence of symbol representations (e.g., token embeddings 314) are mapped to a sequence of continuous representations (e.g., position embeddings 316). The objective of the transformer 320 is thus to generate an output sequence, one element at a time, of the input text 402 values (e.g., words) represented by the token embeddings 314.

Upon receipt of the positional encoding 406, the attention module 408 of the transformer 320 applies an attention function to the positional encoding 406. As described herein, the attention function applied by the attention module 408 represents a mapping of a query and a set of key-value pairs to an output, where the query, keys, values, and output are all vectors. The output is computed as a weighted sum of the values, where the weight assigned to each value is computed by a compatibility function of the query with the corresponding key. In accordance with one or more implementations, the attention function applied by the attention module 408 is masked multi-headed self-attention 410, which reduces the computational cost associated with determining relationships between words in the input text 402 having greater distances between their associated position embeddings 316.

The masked multi-headed self-attention applied by attention module 408 enables the transformer 320 to model information from different representation subspaces at different positions. Stated mathematically, the masked multi-headed self-attention 410 may be represented as indicated below in Equation 2.

$$\text{MultiHead}(Q,K,V)=\text{Concat}(\text{head}_1, \ldots, \text{head}_h)W^O$$

$$\text{where head}_i=\text{Attention}(QW_i^Q, KW_i^K, VW_i^V) \quad (\text{Eq. 2})$$

In Equation 2, $Q$ represents the queries, K represents the keys, and V represents the values of the attention function implemented by the attention module 408, where the queries and keys are of dimension $d_k$ and the values are of dimension $d_v$. Projections output by the attention module 408 in implementing the masked multi-headed self-attention 410 are parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_v}$, and $W^O \in \mathbb{R}^{hd_v \times d_{model}}$. In these parameter matrices, h is an integer representing a number of parallel attention layers, or heads, employed by attention module 408. In accordance with one or more implementations, attention module 408 employs eight parallel attention layers. The output of the attention function applied to the positional encoding 406 by the attention module 408 is then normalized by the layer normalization module 412 before being passed to the feed forward network 414. In this manner, the layer normalization module 412 is representative of functionality of the transformer 320 to normalize information output by a previous layer of the transformer network 318. In an example encoder-decoder attention layer, the layer normalization module 412 is configured to normalize information output by an encoder to a decoder as well as information output from the previous decoder layer to the encoder.

The feed forward network 414 is representative of functionality of the transformer 320 to apply two linear transformations to received data, with a rectified linear unit (ReLU) activation applied in between the linear transformations. Functionality of the feed forward network 414 can be represented mathematically as described in Equation 3.

$$\text{FFN}(x)=\max(0, xW_1+b_1)W_2+b_2 \quad (\text{Eq. 3})$$

As indicated by Equation 3, the linear transformations of the feed forward network 414 are applied in a pointwise manner, such that the linear transformations are applied to each position noted in the positional encoding 406 in a separate and identical manner. Output values from the feed forward network 414 are again normalized by the layer normalization module 412, represented as the output probability 404, which can then be provided as input to another transformer 320 of the transformer network 318. In some implementations, the output probability 404 is further generated by applying a softmax function to the output of the layer normalization module 412, which maps the output of the transformer 320 to a probability distribution over predicted output classes. In this manner, the output probability 404 corresponds to a prediction of an underlying word in the input text 402 represented by a mask token embedding 314.

In accordance with one or more implementations, the output probability 404 may represent a single word predicted as being masked by a mask token embedding 314 in the input text 402. Alternatively, the output probability 404 may represent a probability distribution comprising multiple words, each with associated prediction values 0<1 indicating a probability that the word is represented by a mask token, where the prediction values in the probability distribution collectively amount to one. Having considered an example transformer architecture, consider now an example encoder-decoder framework generated based on the example transformer architecture useable by the stylistic rewriting system 104 to rewrite input text in the writing style of a target author in accordance with aspects of the techniques described herein.

Figure 5:
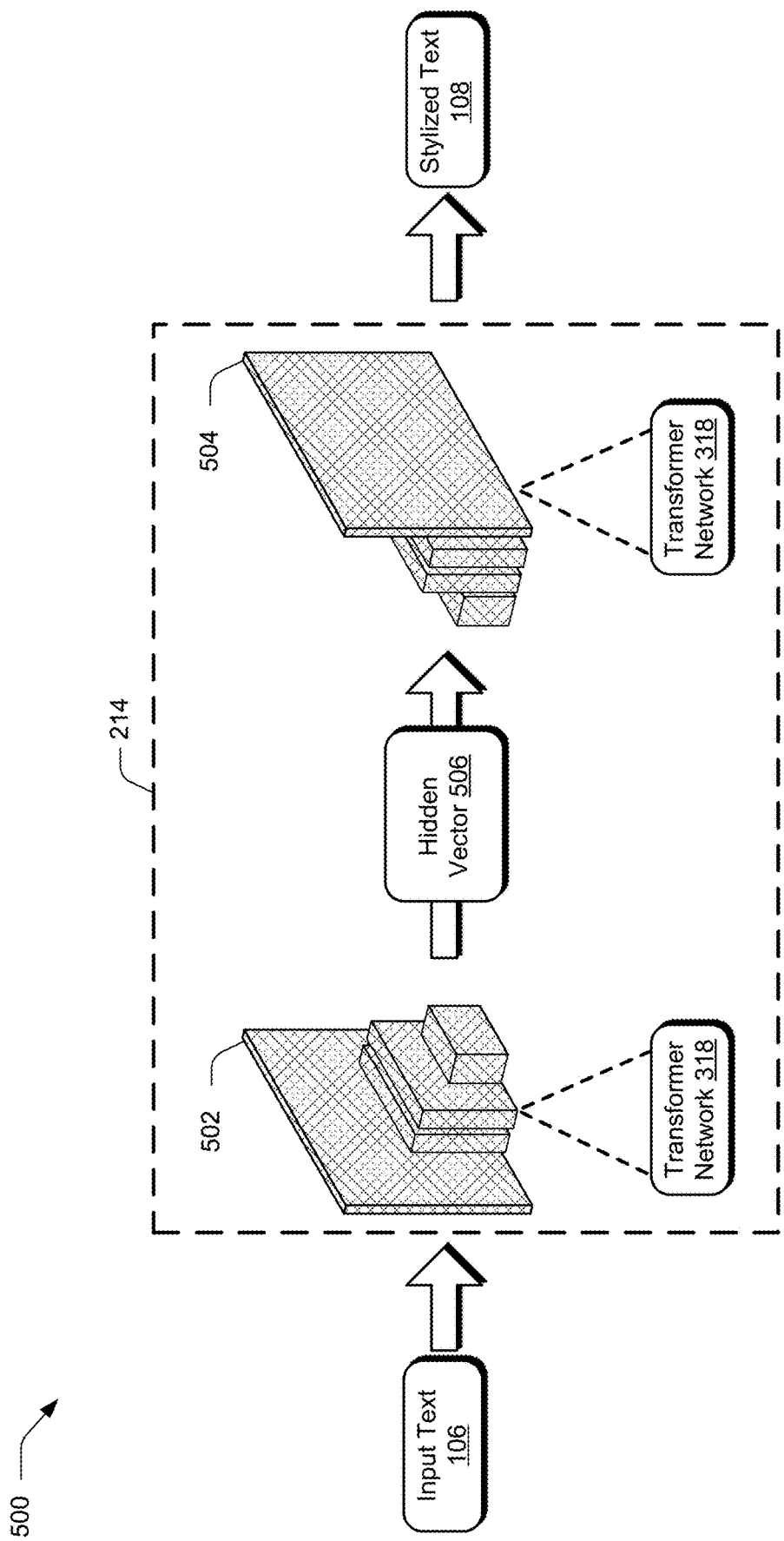
FIG. 5 illustrates an example implementation of the stylistic rewriting system of FIG. 1 generating stylized text from input text using an encoder-decoder framework with both encoder and decoder portions generated from a transformer-based language model.

FIG. 5 illustrates an example implementation of the stylistic rewriting system 104 generating stylized text 108 from input text 106 using an encoder-decoder framework with both encoder and decoder portions generated from transformer-based language model 210. In the illustrated example, the encoder-decoder framework is represented as encoder 502 and decoder 504, where each of the encoder 502 and decoder 504 are generated based on the transformer network 318, which includes a plurality of transformers 320 as described with respect to FIGS. 3 and 4. Collectively, the encoder-decoder framework illustrated in FIG. 5 is representative of a trained language model 214 generated by the language modeling module 112 of the stylistic rewriting system, which is trained on a target author corpus 204 to understand the writing style of a target author.

In the illustrated example, the input text 106 is provided to the encoder-decoder framework of the trained language model 214. By virtue of both the encoder 502 and the decoder 504 being trained using noisy input text (e.g., the masked ILT corpus 206 and/or the masked target author corpus 208), the encoder 502 is configured to adapt to a generic input text not having shuffled or masked words (e.g., the input text 106) and capture information included in the generic input text. In response to receiving the input text 106, the encoder 502 generates a hidden vector 506, which captures information included in the input text 106 and formats the captured information in a manner that is readable by the decoder 504. Being trained to understand a linguistic style of a target author via the target author corpus 204, the decoder 504 uses the hidden vector 506 to rewrite the input text 106 in the linguistic style of the target author, represented as the stylized text 108.

Having considered example details of generating stylized text by rewriting an input text using the linguistic style of a target author, consider now example procedures to illustrate aspects of the techniques described herein.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5.

Figure 6:
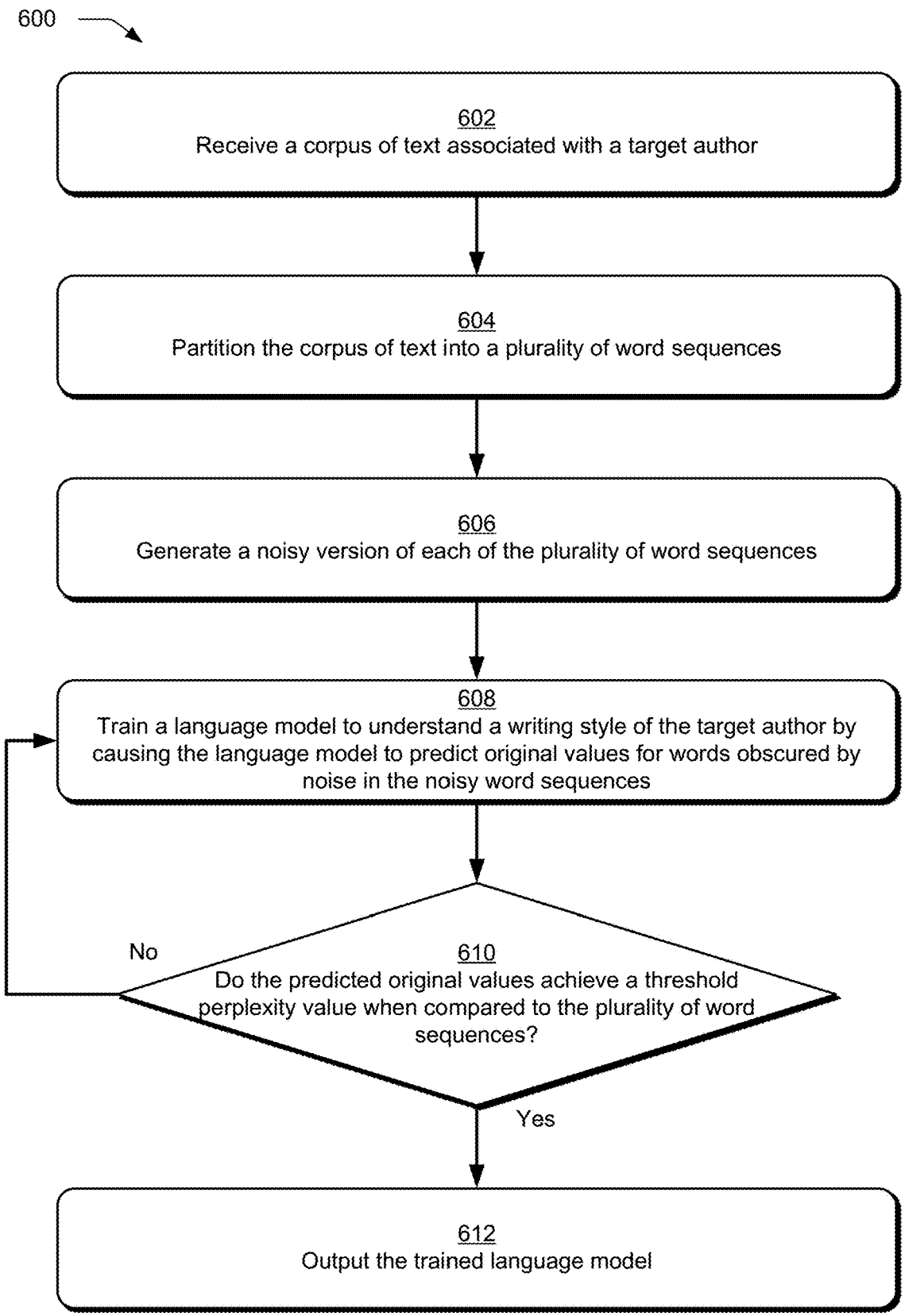
FIG. 6 is a flow diagram depicting a procedure in an example implementation for training a language model to identify a writing style of a target author using the techniques described herein.

FIG. 6 depicts a procedure 600 in an example implementation of training a language model to understand a writing style of a target author, for use in rewriting an input text in the writing style of the target author in accordance with aspects of the techniques described herein. A corpus of text associated with a target author is received (block 602). The text modification module 110 of the stylistic rewriting system 104, for instance, receives the target author corpus 204. The target author corpus 204 is representative of a collection of texts authored by, or attributable to, the target author. As described herein, the target author may be a single individual or may be a group of individuals (e.g., multiple members of an entity's communications team, where the communications team collectively authors text on behalf of the entity).

In accordance with one or more implementations, the target author corpus 204 is received from a user of the computing device implementing the stylistic rewriting system 104. Alternatively or additionally, the target author corpus 204 is received from a location remote from the computing device implementing the stylistic rewriting system 104, such as from remote storage location 116, from a different computing device, combinations thereof, and so forth. In some implementations, the target author corpus 204 may be automatically retrieved by the stylistic rewriting system 104 in response to receiving an identity of the target author. For instance, the stylistic rewriting system 104 may receive input specifying an identity of the target author and query one or more databases for texts associated with the target author's identity for use as the target author corpus 204.

The corpus of text is then partitioned into a plurality of word sequences (block 604). The text modification module 110 of the stylistic rewriting system 104, for instance, separates each sentence included in the target author corpus 204 into a different sequence. Alternatively or additionally, the plurality of word sequences generated by the text modification module 110 may comprise any specified number of sentences, a paragraph, a specified number of paragraphs, and so forth. A noisy version of each of the plurality of word sequences is then generated (block 606). The text modification module 110 of the stylistic rewriting system 104, for instance, generates a noisy version of each word sequence generated from the target author corpus 204 by replacing a subset of words in the sequence with a "[mask]" token, which conceals the underlying value of the word from being ascertained by the stylistic rewriting system 104. In some implementations, the text modification module 110 may further shuffle the respective positioning of one or more words in the word sequence, relative to one another, in generating the noisy version of the word sequence. The noisy version of each of the plurality of word sequences is then output by the text modification module 110, which are collectively represented by the masked target author corpus 208.

A language model is then trained to understand a writing style of the target author by causing the language model to predict original values for words obscured by noise in the noisy word sequences (block 608). The language modeling module 112 of the stylistic rewriting system 104, for instance, obtains a transformer-based language model 210 that has been pre-trained to understand nuances of the language in which the target author corpus 204 is written. In some implementations, the transformer-based language model 210 is pre-trained by the language modeling module 112 using the techniques described herein. The pre-trained transformer-based language model 210 is then cascaded into an encoder-decoder framework where both the encoder and decoder are based on the transformer-based langue model 210. The masked target author corpus 208 is provided as input to the encoder-decoder framework, with a masked language objective, and fine-tuned using denoising auto-encoder loss 212 to generate the trained language model 214. By fine-tuning the encoder-decoder framework of the trained language model 214 using denoising auto-encoder loss, the encoder aims to generate the underlying values of words masked in the masked target author corpus 208, which are then provided as input to the decoder. The decoder subsequently attempts to reconstruct a clean version of the noisy input text.

The predicted original values output by the decoder portion are then analyzed to determine whether the trained language model achieves a threshold perplexity value when compared to the plurality of word sequences (block 610). The language modeling module 112, for instance, compares the predicted original values output by the decoder portion of the trained language model 214 to the corresponding words in the target author corpus 204 to determine whether there are any differences between the predicted original values and words in the target author corpus 204. Differences are assessed against a threshold perplexity value to determine whether the language modeling module 112 has completed training of the trained language model 214. In some implementations, the threshold perplexity value specifies that training should continue until the output of the decoder shows no perplexity over comparison to the ground truth (e.g., the target author corpus 204). In response to determining that the output of the trained language model 214 fails to satisfy the threshold perplexity value, the language modeling module 112 continues training the language model, as indicated by the arrow returning to block 608.

Responsive to determining that the predicted original values generated by the trained language model satisfy the threshold perplexity value, the trained language model is output (block 612). The language modeling module 112 of the stylistic rewriting system 104, for instance, communicates the trained language model 214 to the text styling module 114 for use in generating stylized text 108 from input text 106. Alternatively or additionally, the trained language model 214 is maintained in storage of the computing device implementing the stylistic rewriting system 104, communicated to remote storage location 116, communicated to one or more different computing devices via network 118, combinations thereof, and so forth.

Figure 7:
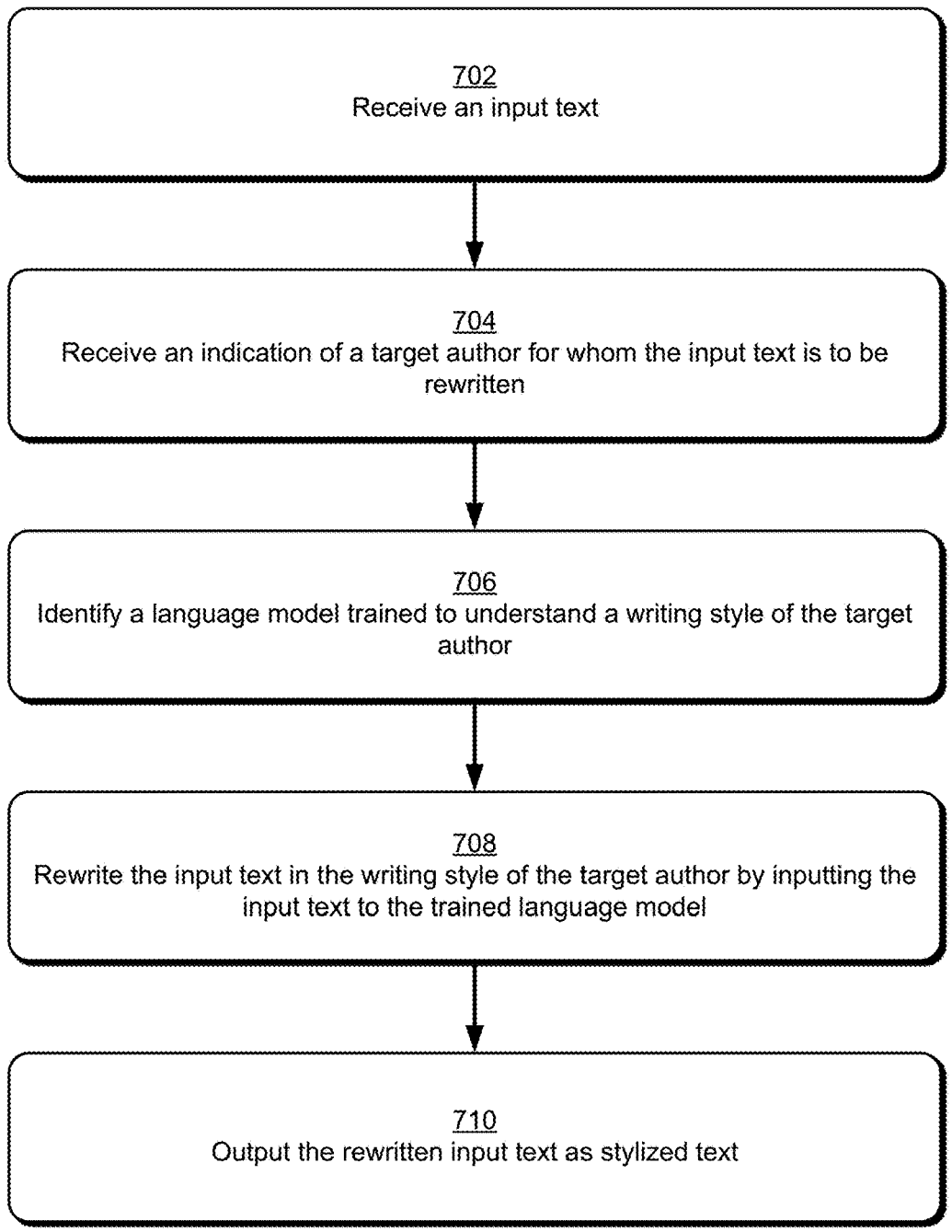
FIG. 7 is a flow diagram depicting a procedure in an example implementation for rewriting input text in the writing style of a target author using the techniques described herein.

FIG. 7 depicts a procedure 700 in an example implementation of generating stylized text by rewriting an input text in the writing style of a target author in accordance with aspects of the techniques described herein. An input text is received (block 702). The stylistic rewriting system 104, for instance, receives input text 106. Input text 106 is representative of text comprising one or more sentences, and may represent text in any one or more possible formats, such as a letter, an electronic message, a story, an essay, a script, combinations thereof, and so forth. In some implementations, the input text 106 is received from a user of the computing device implementing the stylistic rewriting system 104. Alternatively or additionally, the input text 106 may be received from a location remote from the computing device implementing the stylistic rewriting system 104, such as from remote storage location 116 or from a different computing device, via network 118.

An indication of a target author for whom the input text is to be rewritten is then received (block 704). The indication of the target author may be received via user input to a computing device implementing the stylistic rewriting system 104. Alternatively or additionally, the indication of the target author may be received in the form of the target author corpus 204, which represents a collection of texts authored by the target author. As described herein, the target author may be a single individual or may be a group of individuals (e.g., multiple members of an entity's communications team, where the communications team collectively authors text on behalf of the entity).

In accordance with one or more implementations, the target author corpus 204 is received from a user of the computing device implementing the stylistic rewriting system 104. Alternatively or additionally, the target author corpus 204 is received from a location remote from the computing device implementing the stylistic rewriting system 104, such as from remote storage location 116, from a different computing device, combinations thereof, and so forth. In some implementations, the target author corpus 204 may be automatically retrieved by the stylistic rewriting system 104 in response to receiving an identity of the target author. For instance, the stylistic rewriting system 104 may receive input specifying an identity of the target author and query one or more databases for texts associated with the target author's identity for use as the target author corpus 204.

A language model trained to understand a writing style of the target author is then identified (block 706). The stylistic rewriting system 104, for instance, identifies the trained language model 214 based on the indication of the target author. In some implementations where a pre-existing language model trained to understand the writing style of the target author does not exist, the language modeling module 112 is configured to generate the trained language model 214 using the target author corpus 204, as described above and illustrated with respect to FIG. 6.

The input text is then rewritten in the writing style of the target author by inputting the input text to the trained language model (block 708). The text styling module 114 of the stylistic rewriting system 104, for instance, provides the input text 106 to the trained language model 214 received from the language modeling module 112. Upon receiving the input text 106, the encoder portion of the trained language model 214 generates a hidden vector describing information in the input text 106 to be reproduced in the rewritten text and passes the hidden vector to the decoder portion of the trained language model 214. The decoder portion of the trained language model 214 then uses the hidden vector to rewrite the input text in the writing style of the target author.

The rewritten input text is then output as stylized text (block 710). The text styling module 114, for instance, outputs the stylized text 108. The stylized text 108 may then be rendered by the computing device implementing the stylistic rewriting system 104. Alternatively or additionally, the stylized text 108 is maintained in storage of the computing device implementing the stylistic rewriting system 104, communicated to remote storage location 116, communicated to one or more different computing devices via network 118, combinations thereof, and so forth.

Having described example procedures in accordance with one or more implementations, consider now an example system and device that can be utilized to implement the various techniques described herein.

Example System and Device

Figure 8:
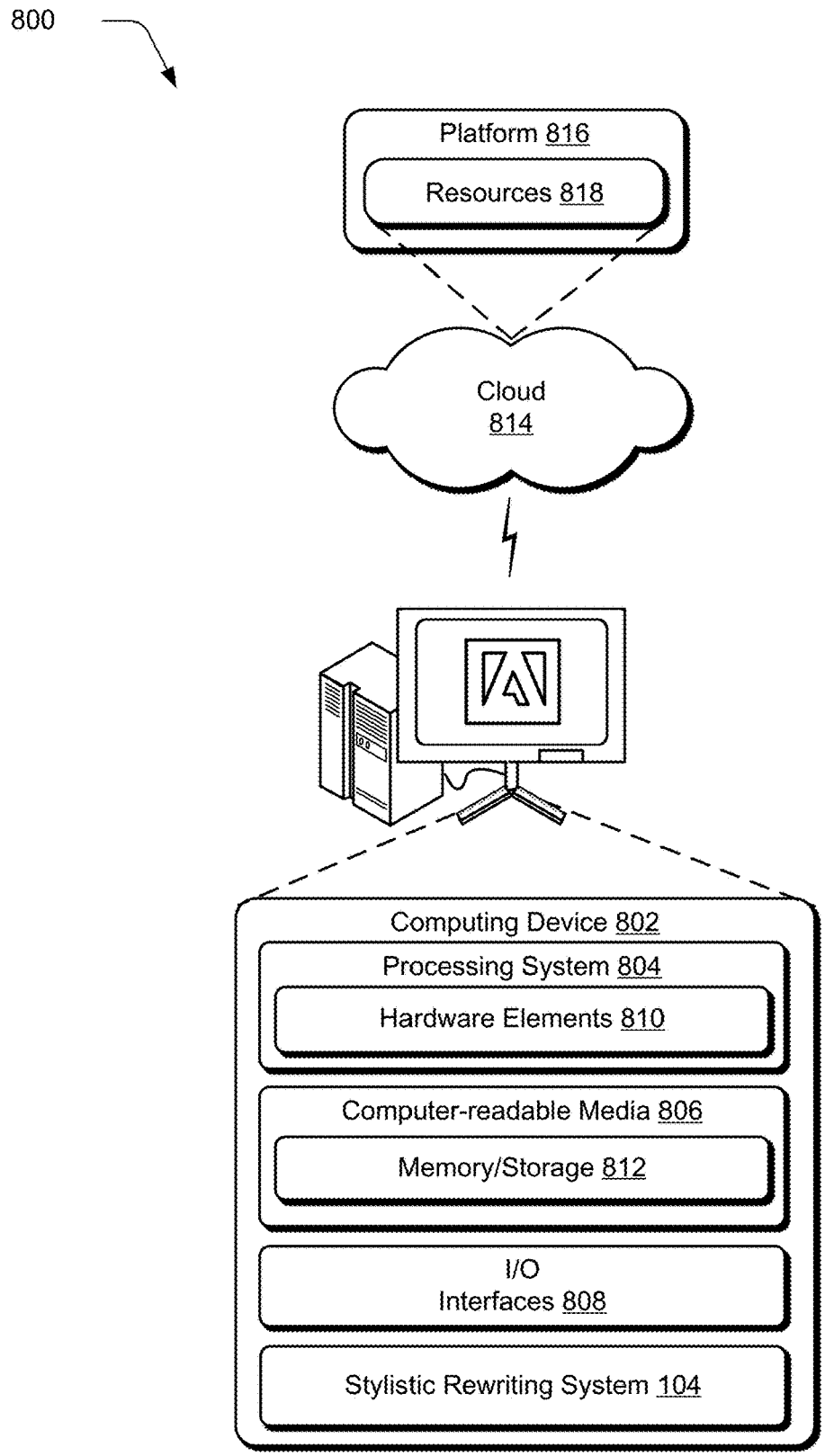
FIG. 8 illustrates an example system including various components of an example device that can be implemented as a computing device as described and/or utilized with reference to FIGS. 1-8 to implement the techniques described herein.

FIG. 8 illustrates an example system generally at 800 that includes an example computing device 802 that is representative of one or more computing systems and/or devices that may implement the various techniques described herein. This is illustrated through inclusion of the stylistic rewriting system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage 812 may include volatile media (such as random-access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system, comprising:
one or more computing devices; and
one or more computer-readable storage media storing instructions which, when executed by the one or more computing devices, cause the one or more computing devices to perform operations including:
receiving a corpus of text associated with an entity;
generating a noisy version of the corpus of text associated with the entity;
training a language model to identify a writing style of the entity by predicting original text values that are obscured in the noisy version of the corpus of text until the predicted original values achieve a threshold perplexity value to the corpus of text associated with the entity; and
outputting the trained language model.

2. The system of claim 1, wherein generating the noisy version of the corpus of text comprises masking a subset of text values included in the corpus of text.

3. The system of claim 1, wherein generating the noisy version of the corpus of text comprises replacing one or more text values in the corpus of text with a different text value.

4. The system of claim 1, wherein generating the noisy version of the corpus of text comprises changing a position of at least one text value in the corpus of text relative to other text values in the corpus of text.

5. The system of claim 1, wherein training the language model to identify the writing style of the entity is performed independent of a parallel corpus of text that contrasts the writing style of the entity with a different entity.

6. The system of claim 1, wherein training the language model to identify the writing style of the entity is performed independent of an annotation in the corpus of text that identifies an aspect of the writing style of the entity.

7. The system of claim 1, wherein the entity comprises a collection of different authors and the corpus of text includes writings authored by the collection of different authors.

8. A method, comprising:
receiving a corpus of text associated with an entity;
generating a noisy version of the corpus of text associated with the entity;
training a language model to identify a writing style of the entity by predicting original text values that are obscured in the noisy version of the corpus of text until the predicted original values achieve a threshold perplexity value to the corpus of text associated with the entity; and
outputting the trained language model.

9. The method of claim 8, wherein generating the noisy version of the corpus of text comprises masking a subset of text values included in the corpus of text.

10. The method of claim 8, wherein generating the noisy version of the corpus of text comprises replacing one or more text values in the corpus of text with a different text value.

11. The method of claim 8, wherein generating the noisy version of the corpus of text comprises changing a position of at least one text value in the corpus of text relative to other text values in the corpus of text.

12. The method of claim 8, wherein training the language model to identify the writing style of the entity is performed independent of a parallel corpus of text that contrasts the writing style of the entity with a different entity.

13. The method of claim 8, wherein training the language model to identify the writing style of the entity is performed independent of an annotation in the corpus of text that identifies an aspect of the writing style of the entity.

14. The method of claim 8, wherein the entity comprises a collection of different authors and the corpus of text includes writings authored by the collection of different authors.

15. A computer-readable storage medium storing instructions that are executable by a processing device to perform operations comprising:
receiving a corpus of text associated with an entity;
generating a noisy version of the corpus of text associated with the entity;
training a language model to identify a writing style of the entity by predicting original text values that are obscured in the noisy version of the corpus of text until the predicted original values achieve a threshold perplexity value to the corpus of text associated with the entity; and
outputting the trained language model.

16. The computer-readable storage medium of claim 15, wherein generating the noisy version of the corpus of text comprises masking a subset of text values included in the corpus of text.

17. The computer-readable storage medium of claim 15, wherein generating the noisy version of the corpus of text comprises replacing one or more text values in the corpus of text with a different text value.

18. The computer-readable storage medium of claim 15, wherein generating the noisy version of the corpus of text comprises changing a position of at least one text value in the corpus of text relative to other text values in the corpus of text.

19. The computer-readable storage medium of claim 15, wherein training the language model to identify the writing style of the entity is performed independent of a parallel corpus of text that contrasts the writing style of the entity with a different entity.

20. The computer-readable storage medium of claim 15, wherein training the language model to identify the writing style of the entity is performed independent of an annotation in the corpus of text that identifies an aspect of the writing style of the entity.

* * * * *